(12) United States Patent
Salanne et al.

(10) Patent No.: US 11,945,592 B2
(45) Date of Patent: Apr. 2, 2024

(54) SYSTEM FOR CONVERTING AND TRANSPORTING ELECTRICAL ENERGY FOR THE INTERNAL HYBRIDIZATION OF AN AIRCRAFT WITH TURBOJET ENGINES

(71) Applicant: SAFRAN, Paris (FR)

(72) Inventors: Jean-Philippe Hervé Salanne, Moissy-Cramayel (FR); Stéphane Petibon, Moissy-Cramayel (FR); Florent Rougier, Moissy-Cramayel (FR); René Meunier, Moissy-Cramayel (FR); Meriem Abdellatif, Moissy-Cramayel (FR)

(73) Assignee: SAFRAN, Paris (FR)

( * ) Notice: Subject to any disclaimer, the term of this patent is extended or adjusted under 35 U.S.C. 154(b) by 481 days.

(21) Appl. No.: 17/288,062

(22) PCT Filed: Oct. 22, 2019

(86) PCT No.: PCT/FR2019/052518
§ 371 (c)(1),
(2) Date: Apr. 23, 2021

(87) PCT Pub. No.: WO2020/089544
PCT Pub. Date: May 7, 2020

(65) Prior Publication Data
US 2021/0380264 A1 Dec. 9, 2021

(30) Foreign Application Priority Data
Oct. 31, 2018 (FR) ...................................... 1860071

(51) Int. Cl.
*B64D 27/24* (2006.01)
*B64D 27/02* (2006.01)
*H02J 4/00* (2006.01)

(52) U.S. Cl.
CPC ................ *B64D 27/24* (2013.01); *H02J 4/00* (2013.01); *B64D 27/026* (2024.01); *B64D 2221/00* (2013.01); *H02J 2310/44* (2020.01)

(58) Field of Classification Search
CPC ........ B64D 27/24; B64D 27/10; B64D 27/16; B64D 2027/026; B64D 2221/00; H02J 4/00; H02J 2310/44; B64F 5/60
See application file for complete search history.

(56) References Cited

U.S. PATENT DOCUMENTS

| 2014/0333127 | A1* | 11/2014 | Edwards | .................. H02J 4/00 307/9.1 |
| 2018/0265206 | A1* | 9/2018 | Himmelmann | ........ B64D 27/24 |

(Continued)

FOREIGN PATENT DOCUMENTS

| EP | 3296212 A1 | 3/2018 |
| EP | 3375981 A1 | 9/2018 |

OTHER PUBLICATIONS

International Search Report in corresponding Application No. PCT/FR2019/052518, dated Feb. 5, 2020, (2 pages).

(Continued)

*Primary Examiner* — Rodney A Bonnette
(74) *Attorney, Agent, or Firm* — Bookoff McAndrews, PLLC

(57) ABSTRACT

An aircraft propelled by at least one turbojet engine on which power can be bled or injected via a high-pressure and/or low-pressure turbine shaft and including at least one gas turbine to provide power transients, having a system for converting and transporting electrical energy wherein each of the high-pressure and/or low-pressure turbine shafts is connected to a first doubly-fed asynchronous machine delivering, a first three-phase AC voltage over an AC distribution grid and a second polyphase AC voltage for a first AC/DC bidirectional converter supplying a DC voltage over a DC (Continued)

distribution grid, at least one second DC/AC bidirectional converter connected to the DC distribution grid converting this DC voltage into a third polyphase AC voltage supplying at least one second doubly-fed asynchronous machine engaged with a rotation shaft of the gas turbine, the second doubly-fed asynchronous machine further delivering a fourth polyphase AC voltage over the AC distribution grid.

8 Claims, 3 Drawing Sheets

(56) References Cited

U.S. PATENT DOCUMENTS

2020/0036319 A1* 1/2020 Rannenberg ......... G01R 31/346
2021/0281210 A1* 9/2021 Bachmann ......... H02K 11/0094

OTHER PUBLICATIONS

French Search Report in corresponding Application No. 1860071, dated Sep. 13, 2019, (2 pages).

* cited by examiner

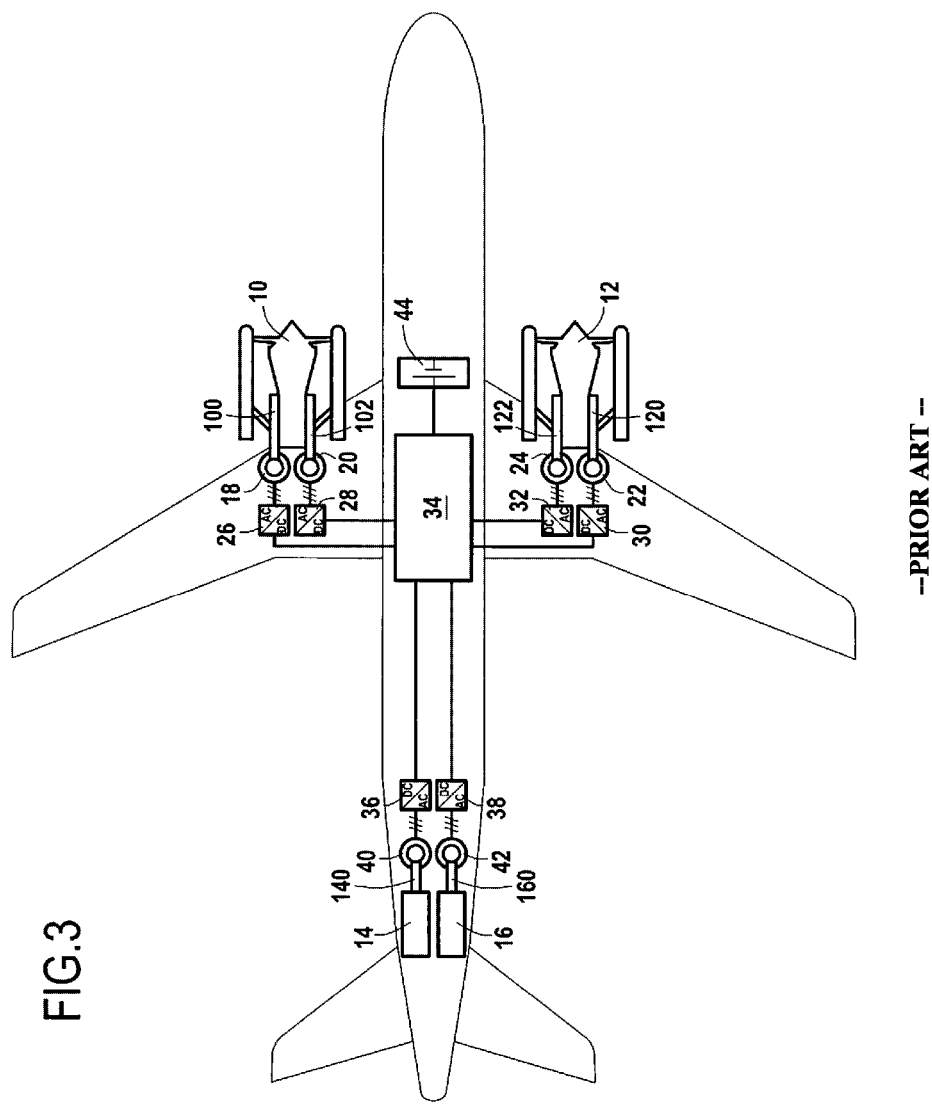
FIG.3 —PRIOR ART—

SYSTEM FOR CONVERTING AND TRANSPORTING ELECTRICAL ENERGY FOR THE INTERNAL HYBRIDIZATION OF AN AIRCRAFT WITH TURBOJET ENGINES

CROSS-REFERENCE TO RELATED APPLICATION(S)

This application is the U.S. national phase entry under 35 U.S.C. § 371 of International Application No. PCT/FR2019/052518, filed on Oct. 22, 2019, which claims priority to French Patent Application No. 1860071, filed on Oct. 31, 2018.

BACKGROUND OF THE INVENTION

This invention relates to the general field of "more electrical" propulsive architectures, more particularly for the internal hybridization of aircraft propellers.

The majority of high-power propulsion solutions have as their source one or more gas turbines suppling mechanical power to a rotary shaft. Specifically, beyond a certain flight time or a certain propulsive power, the electrical storage units (batteries, fuel cells or supercapacitors for example) do not have adequate performance to be used alone and it is therefore advisable to make the mechanical power travel from one shaft to one or more other shafts, to obtain a better operating point by resizing the propellers or by providing a propulsion assistance based on auxiliary sources.

The system of conversion and transportation of electrical energy in an aircraft typically takes the form of one of two types of architecture:

DC architectures, the most common, are composed of generators (the electrical source) equipped with rectifiers converting the entirety of the AC power into DC, which is then distributed then reconverted into AC power by an inverter to power the electrical motors and the different electrical loads. Such an architecture allows a complete uncoupling of the operating points of the source and the loads and permits a speed of rotation of the shafts that is variable from −Ωmax to +Ωmax.

AC architectures, less widespread except for powers above the MW, are composed of generators directly coupled to electrical motors or electrical loads. Such an architecture allows a fixed coupling between the speed of the engine shaft and that of the shafts of the different loads and it allows a high efficiency and better reliability since the power converters have been removed.

For the internal hybridization of the turbojet engines, there are only DC architecture solutions since, the rotation speed being variable, an AC architecture cannot be envisioned.

FIG. 3 illustrates such an architecture known in the context of an aircraft of SMR (Short-Medium Range) type propelled by two turbojet engines 10, 12, one under each wing, on which power can be bled or injected via their high-pressure HP and/or low-pressure LP turbine shaft. Two gas turbines 14, 16 generally disposed in the tail cone of the aircraft are also available to provide power transients.

In this DC architecture, each of the HP 100, 120 and LP 102, 122 shafts of the two turbojet engines is linked to a synchronous machine 18, 20, 22, 24, typically of permanent-magnet type (PMSM), delivering a three-phase alternating voltage for an AC/DC static converter 26, 28, 30, 32 supplying a DC voltage (typically ±270V DC) over the DC distribution grid 34. Two inverters 36, 38 connected to this grid convert this DC voltage into a three-phase AC voltage powering two synchronous machines 40, 42 each engaged with a rotation shaft 140, 160 of the gas turbines 14, 16. All the high-power electrical protectors (contact switches and other circuit breakers not shown) are disposed on the DC distribution grid. A storage unit 44 can furthermore be shunt-mounted directly on the DC distribution grid.

Such an architecture does however have many drawbacks: the internal short-circuit fault in permanent-magnet machines must be addressed since it is considered as critical and of necessity entails a redundancy (and therefore an additional weight), the loss of a static converter causes the loss of the associated generator, which makes any reconfiguration difficult, or here also entails the adding of a redundancy for each type of converter (so another additional weight), the mass of the protectors is increased since the architecture is DC voltage, and the global efficiency of the line is reduced (efficiency of approximately 80%) due to the many conversions made along the line.

SUBJECT AND SUMMARY OF THE INVENTION

The main aim of this invention is thus to palliate such drawbacks by making provision for a new architecture particularly suitable for the internal hybridization of aircraft.

These aims are achieved by a system for converting and transporting electrical energy in an aircraft propelled by at least one turbojet engine on which power can be bled or injected via a high-pressure and/or low-pressure turbine shaft and including at least one gas turbine to provide power transients, characterized in that each of said high-pressure and/or low-pressure turbine shafts is connected to a first doubly-fed asynchronous machine delivering, on the one hand, a first three-phase AC voltage over an AC distribution grid and on the other hand a second polyphase AC voltage for a first AC/DC bidirectional converter supplying a DC voltage over a DC distribution grid, at least one second DC/AC bidirectional converter connected to said DC distribution grid converting this DC voltage into a third polyphase AC voltage supplying at least one second doubly-fed asynchronous machine engaged with a rotation shaft of said at least one gas turbine, said second doubly-fed asynchronous machine further delivering a fourth polyphase AC voltage over said AC distribution grid.

Bu using a doubly-fed asynchronous machine, which allows the transportation of the main power in AC and its control in DC, i.e. a machine that contains two electrically segregated supply channels, the advantages of an AC architecture and a DC architecture are combined. Furthermore, by using a bidirectional converter supplying a part of the doubly-fed asynchronous machine, it is possible to have operating modes with a weakly variable speed.

Preferably, the system further includes a storage unit shunt-mounted directly on said DC distribution grid.

Advantageously, all the high-power electrical protectors (contact switches and/or circuit breakers) are disposed on said AC distribution grid.

Preferably, said doubly-fed asynchronous machine is a wound rotor induction generator, the stator windings of which are directly connected to said AC distribution grid and the rotor windings of which are connected to said AC/DC bidirectional converter.

BRIEF DESCRIPTION OF THE DRAWINGS

Other features and advantages of this invention will become apparent from the description given below, with reference to the appended drawings which illustrate an exemplary embodiment thereof devoid of any limitation. In the figures:

FIG. 3 shows an operating diagram of an architecture providing internal hybridization of aircraft of the prior art.

DETAILED DESCRIPTION OF THE INVENTION

Figure 1:
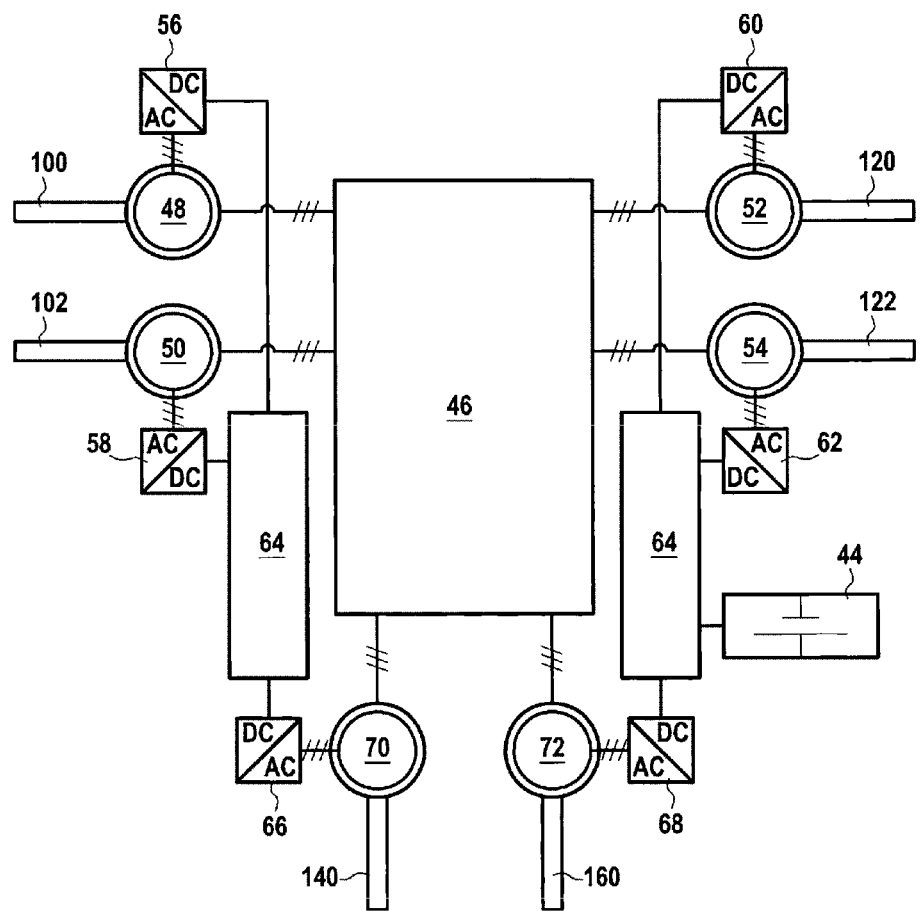
FIG. 1 shows an operating diagram of an architecture providing internal hybridization of aircraft according to the invention.

FIG. 1 shows a system for converting and transporting electrical energy in an aircraft according to the invention wherein, as in an AC architecture, transportation of the main power is provided through an AC distribution grid 46.

The following description is given with reference to an aircraft of SMR type similar to that illustrated in FIG. 3, i.e. propelled by two turbojet engines on which, according to the operating modes implemented, it is possible to bleed or inject power via the high-pressure 100, 120 and/or low-pressure 102, 122 shaft, the aircraft further including two gas turbines to provide power transients. Of course, this aircraft configuration is in no way limiting and is also applicable for example to an aircraft with a single turbojet engine including only a single gas turbine or an aircraft with n turbojet engines (with n>2). In the same way, if in the following description, the AC voltages are three-phase they can of course be polyphase (number of phases>3).

According to the invention, each of the high-pressure and/or low-pressure shafts of the two turbojet engines is connected to a first doubly-fed asynchronous machine 48, 50, 52, 54 delivering, on the one hand, a first three-phase AC voltage over the AC distribution grid 46 and on the other hand a second three-phase AC voltage for first AC/DC bidirectional converters 56, 58, 60, 62 supplying a DC voltage over a DC distribution grid 64, second DC/AC bidirectional converters 66, 68 connected to the DC distribution grid converting this DC voltage into a third three-phase AC voltage supplying second doubly-fed asynchronous machines 70, 72 engaged with the rotation shafts 140, 160 of the two gas turbines, these second doubly-fed asynchronous machines further delivering a fourth three-phase AC voltage over the AC distribution grid 46. The storage unit 44 is shunt-mounted directly on the DC distribution grid 64.

A doubly-fed machine has the peculiarity, by comparison with a conventional asynchronous machine, of possessing two supply channels which are electrically segregated. The segregation of the two supplies of the DFAM allows the non-propagation of faults between the two channels and operation in degraded mode. Specifically, if the rotor channel of the DFAM is lost, the machine can continue to operate in degraded mode by short-circuiting this rotor channel.

Another advantage contributed by electrical segregation is the possibility of having two different voltage levels. For example, the main channel of the DFAM which sees the majority of the power pass can be at a high voltage whereas the rotor channel that sees the least power pass can be at a lower voltage. These voltages can be adapted as needed, making it possible to optimize the dimensioning of the system (particularly in mass).

The doubly-fed asynchronous machine (DFAM) is a wound rotor induction generator, the stator windings of which are connected directly to the AC distribution grid and the rotor windings of which are connected to an AC/DC bidirectional converter. The converter is reversible since the rotor power travels in one direction in hypersynchronous operation and in the opposite direction in hyposynchronous operation. Note that such an asynchronous machine has the peculiarity of making it possible to generate mechanical torque on the output shaft even if the magnetic field does not rotate at the same speed as the rotor. Unlike conventional asynchronous machines where the rotation speed of the rotor is proportional to the electrical frequency at the level of the stator, it further allows for an adjustment of this rotor rotation speed as a function of the electrical frequencies at the level of the stator and rotor.

More specifically, in hypersynchronous operation, the generator rotates at a higher rotation speed than the synchronism speed and the converter then operating as a rectifier delivers a DC voltage for the DC distribution grid. Similarly, in hyposynchronous operation, the generator rotates at a rotation speed lower than the synchronism speed and the converter then operating as an inverter delivers an AC voltage to the DFAM from the DC distribution grid. The inverter adjusts the amplitude and frequency of the signal to be sent to the rotor making the speed, and therefore the power extracted from the DFAM, vary.

With the configuration of the conversion system according to the invention, there are the same number of converters as in a DC architecture of the prior art, but these converters only handle a part of the transferred nominal power (in the order of 25 to 30%), which makes it possible to choose lighter, less bulky and less expensive converters, whereas in the DC architecture electrical converters are dimensioned to make the nominal power pass through. Even if DFAMs are heavier than the PMSMs of the DC architecture of the prior art, the assembly is lighter (in the order of 5 to 10%) since the converters are of far lower power. Also, all high-power electrical protectors (contactors and/or circuit breakers) are disposed on the AC distribution grid and not on the DC distribution grid, which again reduces the bulk and cost.

Moreover, in the case of internal hybridization, it is possible to dissociate the DC distribution grid serving to provide speed variation of the mechanical shafts of the AC distribution grid over which most of the power travels, which makes it possible to obtain better efficiency (in the order of 2 to 5% greater) and, by providing galvanic insulation between the main power providing propulsion and its control, simplifies segregation problems.

Figure 2:
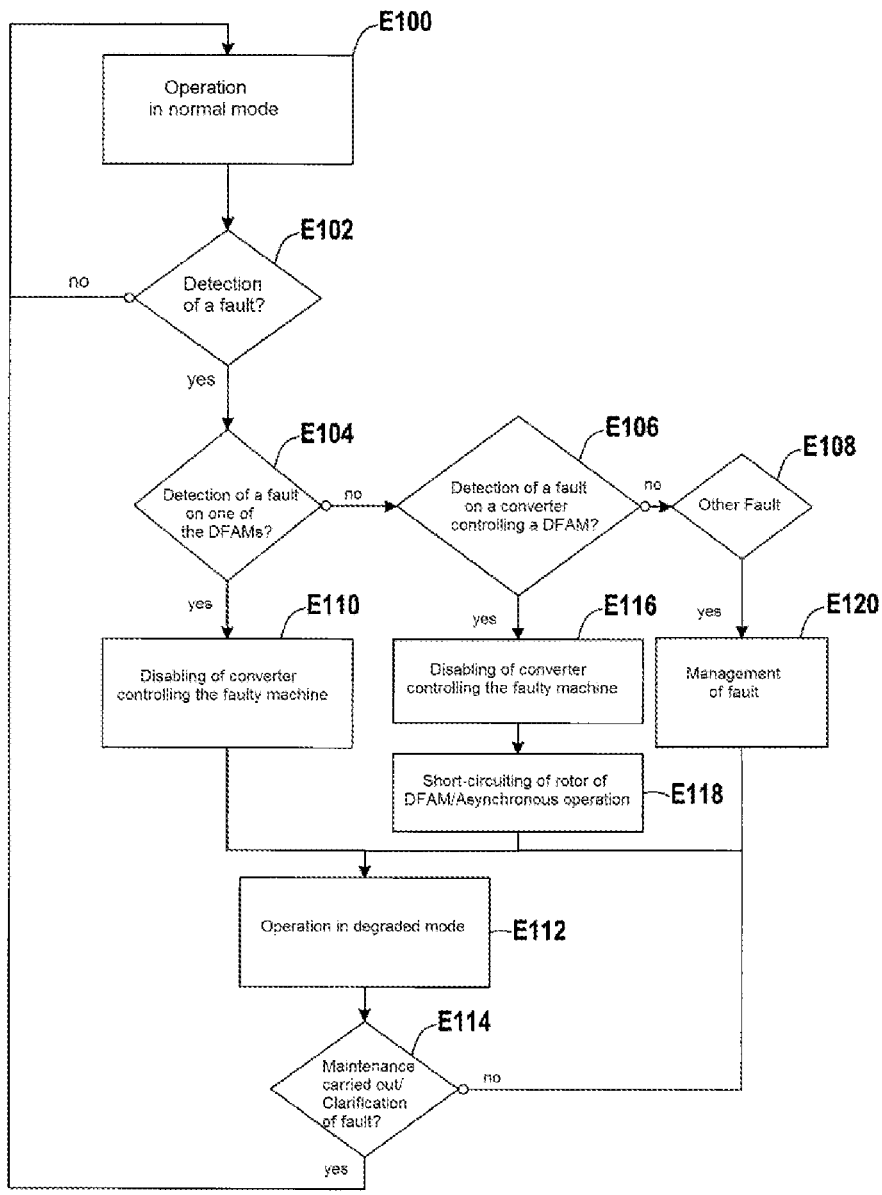
FIG. 2 is a flow chart illustrating fault management in the architecture of FIG. 1.

Finally, with the invention, a fault of one of the converters degrades the operation of the line between sources and loads but does not stop it, as illustrated by the flowchart of FIG. 2 which describes the management of faults in the system for converting and transporting electrical energy of the invention. With the first step E100 corresponding to a normal operation of the system of the invention, in the following test step E102 a fault is detected. In the absence of a fault, the process returns to step E100 but if a fault is detected (YES answer to the test of step E102), in steps E104, E106 and E108 three tests are carried out to search for the nature of this fault, a YES answer to the first test of step E104 signifying that the fault was detected on a DFAM, a YES answer to the second test of step E106 signifying that the fault was detected on a converter controlling a DFAM and a YES answer to the third test of step E108 signifying that the fault is of another nature (for example the loss of a phase or the poor quality of the power grid). If the fault was detected on a DFAM, in a step E110 the converter controlling this DFAM is disabled (which is enough to guarantee the non-propagation of the fault) bringing the system into a degraded operation mode (step E112) for as long as the fault is not resolved or corrective maintenance carried out (step E114). If the fault was detected on a converter controlling a DFAM, in a next step E116 the concerned converter is then disabled and the DFAM is reduced to asynchronous operation by short-circuiting its rotor (step E118) once again bringing the system into the degraded operating mode of step E112 which will last for as long as the fault is not removed or corrective maintenance carried out (step E114). If the fault is of another kind, then in a step E120 this fault bringing the system into degraded operating mode is treated (step E112) for as long as the fault is not resolved or corrective maintenance carried out (step E114). Whatever the nature of the fault detected, once this fault is resolved or the appropriate corrective maintenance carried out (step E114), there can be a return to the normal operating mode of step E100.

Thus, with this invention, provision is made for an architecture optimized for internal hybridization making it possible to transfer power between the shafts of the turbojet engines (propellers) and provide propulsive assistance from the gas turbines (auxiliary sources). The propeller is the primary power source of the aircraft and must therefore supply the energy needed for the non-propulsive systems of the aircraft. It is however advantageous to transfer the power from an LP shaft to an HP shaft or conversely according to the transient under consideration (the operating point transients of the propeller determine the dimensions of the turbojet engine). The LP shaft of the propeller is thus usable to perform bleeding and provide propulsion assistance and the gas turbine, optimized for low powers, makes it possible to have additional power during certain flight phases while providing better energy density than batteries.

The invention claimed is:

1. A system for converting and transporting electrical energy in an aircraft propelled by at least one turbojet engine on which power can be bled or injected via a high-pressure and/or low-pressure turbine shaft and including at least one gas turbine to provide power transients, wherein each of said high-pressure and/or low-pressure turbine shafts is connected to a first doubly-fed asynchronous machine delivering, on the one hand, a first three-phase AC voltage over an AC distribution grid and on the other hand a second polyphase AC voltage for a first AC/DC bidirectional converter supplying a DC voltage over a DC distribution grid, at least one second DC/AC bidirectional converter connected to said DC distribution grid converting this DC voltage into a third polyphase AC voltage supplying at least one second doubly-fed asynchronous machine engaged with a rotation shaft of said at least one gas turbine, said second doubly-fed asynchronous machine further delivering a fourth polyphase AC voltage over said AC distribution grid.

2. The system for converting and transporting electrical energy as claimed in claim 1, wherein the system further includes a storage unit shunt-mounted directly on said DC distribution grid.

3. The system for converting and transporting electrical energy as claimed in claim 1, wherein all the high-power electrical protectors are disposed on said AC distribution grid.

4. The system for converting and transporting electrical energy as claimed in claim 3, wherein the high-power electrical protectors include contact switches and/or circuit breakers.

5. The system for converting and transporting electrical energy as claimed in claim 1, wherein the first and/or the second doubly-fed asynchronous machine is a wound rotor induction generator, the stator windings of which are directly connected to said AC distribution grid and the rotor windings of which are connected to the first and/or the second AC/DC bidirectional converter.

6. An aircraft including a system for converting and transporting electrical energy as claimed in claim 1.

7. The aircraft as claimed in claim 6, of Short-Medium Range type including two turbojet engines and two gas turbines.

8. A method for managing faults in a system for converting and transporting electrical energy as claimed in claim 1 comprising the following steps of:
    performing a fault search test;
    when a fault is detected, searching for a nature of the fault;
    when the fault concerns a doubly-fed asynchronous machine or a doubly-fed asynchronous machine controller, disabling the doubly-fed asynchronous machine controller.

* * * * *